H. H. KUENTZ.
EGG CASE.
APPLICATION FILED JAN. 27, 1919.
1,318,500. Patented Oct. 14, 1919.
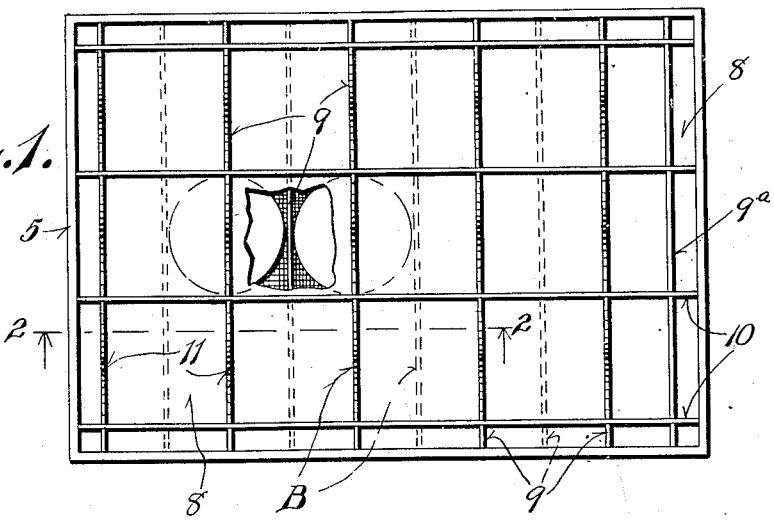
Fig. 1.
Fig. 2. Fig. 3.
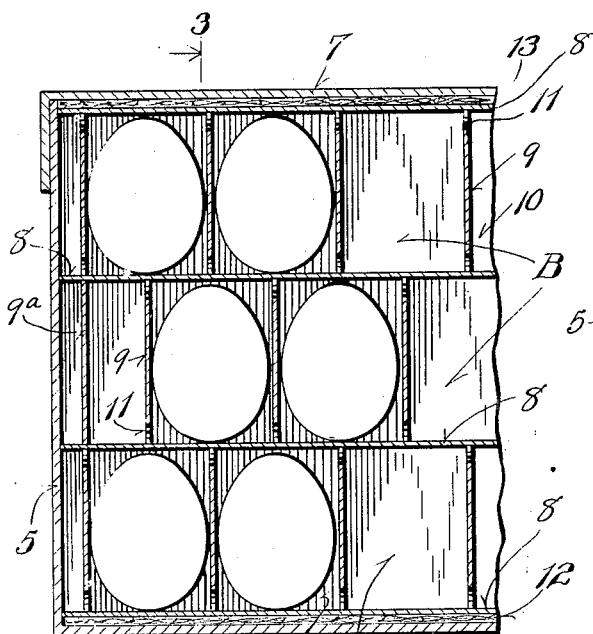
Fig. 4.
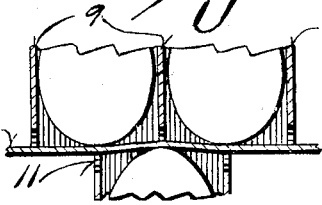
WITNESS
J. F. Britt
INVENTOR
Herman H. Kuentz
BY Young & Young
ATTORNEYS

UNITED STATES PATENT OFFICE.

HERMAN H. KUENTZ, OF MILWAUKEE, WISCONSIN.

EGG-CASE.

1,318,500.　　　　Specification of Letters Patent.　　Patented Oct. 14, 1919.

Application filed January 27, 1919.　Serial No. 273,292.

*To all whom it may concern:*

Be it known that I, HERMAN H. KUENTZ, a citizen of the United States, and resident of Milwaukee, in the county of Milwaukee and State of Wisconsin, have invented certain new and useful Improvements in Egg-Cases; and I do hereby declare that the following is a full, clear, and exact description thereof.

My invention relates to new and useful improvements in cellular structures for packing eggs or like fragile articles, and more particularly of the general type found in commercial egg crates, comprising tiers of filler members each formed of series of crossed strips transversely slotted for mutual engagement to dispose corresponding edges of the strips in a common plane.

It is in general the object of my invention to provide a cellular packing structure of this nature which reduces to a minimum the possibility of breakage of eggs packed therein incidental to the jars and stresses occasioned by transportation.

It is more particularly my object to accomplish this result with a minimum expenditure of packing material and in a manner procuring a maximum compactness of structure, a more specific object being to embody the foldable nature of the conventional cellular packing structure.

With the above and other objects and advantages in view, which will be apparent as the description proceeds, my invention resides in the novel features of construction, combination and arrangement of parts as hereinafter more particularly described and defined by the appended claim.

In the accompanying drawings:

Figure 1 is a plan view of a packing structure embodying my invention.

Fig. 2 is a vertical sectional view therethrough on a plane indicated by the line 2—2 of Fig. 1.

Fig. 3 is a vertical sectional view therethrough on a plane at right angles to the plane of Fig. 2, as indicated by the line 3—3 of Fig. 2.

Fig. 4 is a detail sectional view through the structure showing the compensation of eggs of abnormal size.

Referring now more particularly to the drawings, there is provided a main casing or box including the walls 5, bottom 6 and top 7.

My improved packing structure comprises superposed tiers of packing members B disposed within the box and separated by horizontal sheets 8 which form the bottoms of the egg receiving compartments or cells. Each of the cellular members B is formed of the usual crossed series of spaced strips 9 and 10 oppositely slotted to dispose the side edges of the strips in the top and bottom planes of the cellular member and to form rows of egg receiving compartments or cells.

I have found that in protecting eggs the major stresses to be considered are those imparted vertically, and that the horizontal stresses or jolts are not of sufficient consequence under average practical conditions of shipment to require particular consideration. Hence, the plan relation of the cells of each packing member is of conventional nature.

To prevent, however, the vertical transmission of shock from one egg to the other, one series of strips of vertically alternate packing members are offset to lie substantially midway between the corresponding strips of the other packing member or members, in the present instance the strips 9 being offset in this manner, while the strips 10 of the packing members are disposed in vertical alinement. To maintain this relative position of the packing members when disposed in the casing or box, each member is provided with an additional spacer strip $9^a$ spaced from an endmost strip 9, a distance equal to approximately the half the width of the cells or compartments, the extremities of all the strips extending beyond their terminal connections in the usual manner to procure spacing of the outermost compartments or cells from the walls of the box. By this arrangement, the cells are vertically staggered and the eggs contained in the cells of one packing member rest upon the bottom sheet 8 disposed thereunder at a point in the plane of the strips 9.

To permit a cushion action of the bottom sheet, the side edges of the strips 9 are concaved at 11 between each pair of strips 10, both sides of the strip 9 being thus concaved so that the packing member is invertible. The side edges of the strips 10 are straight to retain a firm support of the sheets 8.

An exceedingly simple structure has thus been provided which affords an adequate protection for eggs packed therein against the major stresses encountered in transit, and which may be manufactured at a cost but very slightly in advance of the cost of conventional packing structures of this type.

Eggs vary considerably in size, and eggs frequently occur of greater height than the height of the cell in which they are seated, in such instances, the eggs would bow the adjacent bottom sheets outwardly of the cell, as shown in Fig. 4, this ready yielding support being in decided contrast to the conventional arrangement of packing eggs wherein an increased size of the egg would procure a direct pressure in conjunction with adjacent eggs for the transmission of stresses liable to break said eggs.

Eggs may be packed in connection with the present structure as readily as with the structures now in use. A layer of cushioning material 12 is first placed on the bottom of the box. A bottom sheet 8, followed by a packing member B is then placed on the cushioning material. The cells of this packing member are filled with eggs and a second bottom sheet is seated on the first packing member B. A second packing member is then placed in the box, with its spacing strip 9ᵃ disposed at the opposite side of the box from the spacing strip of the first packing member to thus dispose the cells of the two packing members in offset relation. The second packing member is then filled and one or more subsequent packing members are inserted and filled and the cover applied, a sheet of cushioning material 13 being preferably disposed between the cover and uppermost packing member.

What is claimed is:

A packing structure comprising superposed cellular packing members each including crossed series of spaced strips slotted for mutual engagement to form rows of cells, entirely flat bottom sheets disposed between the cells, the edges of one series of strips being provided with concavities between the other strips, the edges of said other strips being entirely straight whereby to afford support throughout said edges for the bottom sheet, said concaved strips being vertically staggered whereby to prevent direct transmission of stress from an article in one cell to an article in the cell therebelow.

In testimony that I claim the foregoing I have hereunto set my hand at Milwaukee, in the county of Milwaukee and State of Wisconsin.

HERMAN H. KUENTZ.